United States Patent [19]
Bathrick et al.

[11] Patent Number: 5,388,805
[45] Date of Patent: Feb. 14, 1995

[54] DUAL SEAL FOR SHUT-OFF VALVE

[75] Inventors: Leeland M. Bathrick, Crystal Lake, Ill.; Scott A. McReynolds, Bristol, Wis.

[73] Assignee: C.E.B. Enterprises, Inc., Mundelein, Ill.

[21] Appl. No.: 176,900

[22] Filed: Jan. 3, 1994

[51] Int. Cl.6 .......................... F16K 41/04; F16J 15/24
[52] U.S. Cl. ..................................... 251/214; 277/112; 277/125
[58] Field of Search ................ 137/315; 251/215, 221, 251/222, 223, 224, 225, 330; 277/110, 112, 123, 124, 125

[56] References Cited

U.S. PATENT DOCUMENTS

| | | | |
|---|---|---|---|
| 3,198,211 | 8/1965 | Gray, Jr. ............................. | 251/214 |
| 3,257,095 | 6/1966 | Siver ................................... | 251/330 |
| 4,230,299 | 10/1980 | Pierce, Jr. ........................... | 251/330 |
| 4,394,023 | 7/1983 | Hinojosa ............................. | 277/125 |
| 4,486,002 | 12/1984 | Riess et al. ......................... | 277/125 |
| 4,640,305 | 2/1987 | Johnson .............................. | 251/214 |
| 5,263,682 | 11/1993 | Covert et al. ....................... | 251/214 |

FOREIGN PATENT DOCUMENTS 2070203  9/1981  United Kingdom ............... 251/214

Primary Examiner—George L. Walton

[57] ABSTRACT

A two stage seal for a shut-off valve having a bonnet with a rotatable valve stem therethrough. The first seal is conventional packing material axially compressible to adjust its sealing force against the valve stem. The second is a cartridge seal gland with inner and outer "O" rings axially biased against the packing material by a packing nut threaded in the bonnet.

8 Claims, 1 Drawing Sheet

DUAL SEAL FOR SHUT-OFF VALVE

BACKGROUND OF THE INVENTION

Manually operated industrial shut-off valves have been in use for over 100 years to control flow through commercial and industrial fluid flow systems including water systems, a wide variety of chemical systems, and industrial fluid processing systems. Typically, these valves are inline valves having a valve body with approximately coaxial inlets and outlets separated by an integral dividing wall having a valve seat against which a valve member seats. Typically this valve member is axially movable by a valve stem threaded into a bonnet which projects transversely outwardly from the valve body, or in other words, perpendicular to the associated fluid flow line. A hand wheel is attached to the projecting end of the valve stem for manual rotation.

By far the most common sealing system for preventing leakage between the valve stem and the bonnet has in the past taken the form of axially compressible packing materials. These materials are typically a fabric composition, asbestos, or leather, and in some cases a synthetic composite, all generally in annular configuration.

The packing material is usually seated in a counter bore in the bonnet surrounding the valve stem, and it is axially compressed by a packing nut also surrounding the valve stem and threaded into the distal end of the bonnet. The sealing efficacy is adjusted by rotating the packing nut to axially compress the packing material, which upon compression expands radially into progressively tighter engagement with the periphery of the valve stem.

A long-standing problem with this type of packing system is that in order to prevent fluid leakage along the stem from the valve body, it is necessary that the packing nut be driven into the packing material to such an extent that manual rotation of the valve stem is either very difficult or even impossible without loosening the packing nut. And of course, if the packing nut is loosened to permit hand wheel rotation, fluid leaks along the valve stem while the valve is opening or closing.

Another problem with these packing material sealing systems is that they are subject to wear and frequent replacement in applications where the valve is opened and closed frequently.

There have in the past been attempts to reduce or ameliorate these sealing problems with the provision of more than one seal around the valve stem.

One such multiple seal system is shown in the Hansen, U.S. Pat. No. 4,550,896, in which a packing material type seal is supplemented by an axially spaced "O" ring in a counter bore below and spaced from the packing material by a flat washer.

In the Hansen design, a packing nut directly engages and compresses the top of the packing material. While the Hansen system increases the overall sealing efficiency over packing material alone designs, it does not alleviate the problem of over-compression of the packing material and its resulting difficulty in rotating the valve stem to effect valve operation.

Furthermore, the single "O" ring design of Hansen results in "O" ring wear, and the "O" ring is extremely difficult to replace because it is below the packing material in a counter bore in the bonnet so that the packing nut, and the difficult to remove packing material, must be withdrawn from the counter bore each time the "O" ring seal is to be replaced.

It is a primary object of the present invention to ameliorate the problems noted above in packing systems for shut-off valves.

SUMMARY OF THE PRESENT INVENTION

According to the present invention, a two stage seal is provided for the valve stem of a shut-off valve including a first seal consisting of conventional packing material and a second seal gland that provides the primary sealing function of the system consisting of an axially movable cartridge surrounding the valve stem having an inner "O" ring sealing against the valve stem and an outer "O" ring sealing against the counter bore in the valve assembly bonnet.

By designing the cartridge seal to accomplish more than 50% of the sealing function of the two stage seal, the sealing requirements for the packing material are markedly reduced. This permits the packing nut to be permanently relieved or backed off so the packing material does not interfere with the free rotation of the valve stem. This eliminates the prior art requirement of backing off the packing nut every time the hand wheel is operated, and of course, the associated messy leakage until valve actuation is completed and the packing nut again tightened.

The cartridge gland is located above the packing material and directly underneath the packing nut so that upon failure of either "O" ring in the cartridge, it can be easily replaced simply by removing the packing nut and sliding the cartridge out. This is a vast improvement over prior designs which require the difficult removal of the packing material upon failure of the packing material and also some dual seal designs, such as the one described above which requires the packing material removal in order to replace the lower mounted "O" ring upon its failure.

More specifically, the present shut-off valve includes a bonnet threadedly receiving the valve stem with a counter bore ending immediately above the threads in the bonnet, a first washer engaging the lower end of the counter bore followed by the annular packing material and then another washer. The cartridge gland with its inner and outer "O" rings engages the top of this second washer and the packing nut threaded into the end of the counter bore squeezes the entire assembly against the bottom of the counter bore. Thus, the packing material is compressed by the packing nut through the upper washer and the cartridge itself.

Other objects and advantages of the present invention will appear more clearly from the following detailed description.

DETAILED DESCRIPTION OF THE PREFERRED EMBODIMENT

Figure 1:
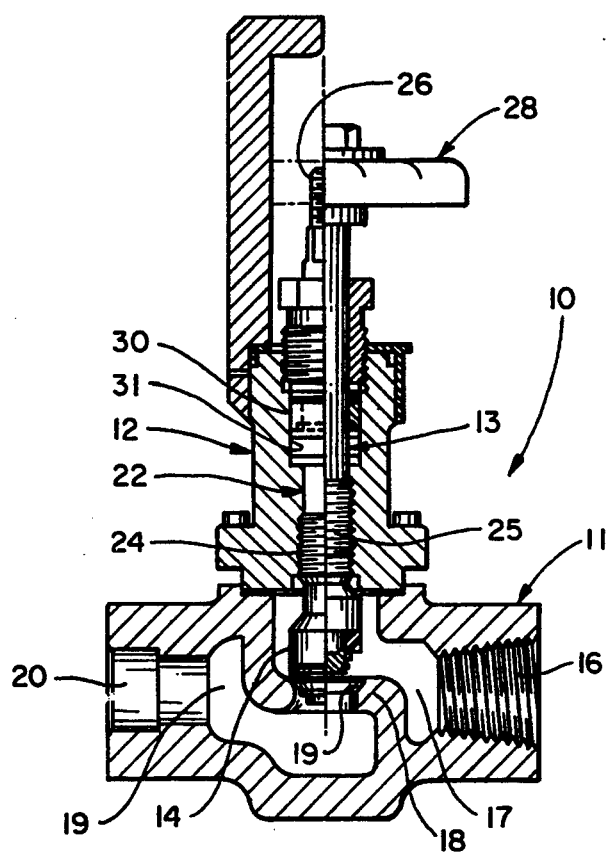
FIG. 1 is a cross-section through the entire shut-off valve with some of the parts shown in one-half elevation.
Figure 2:
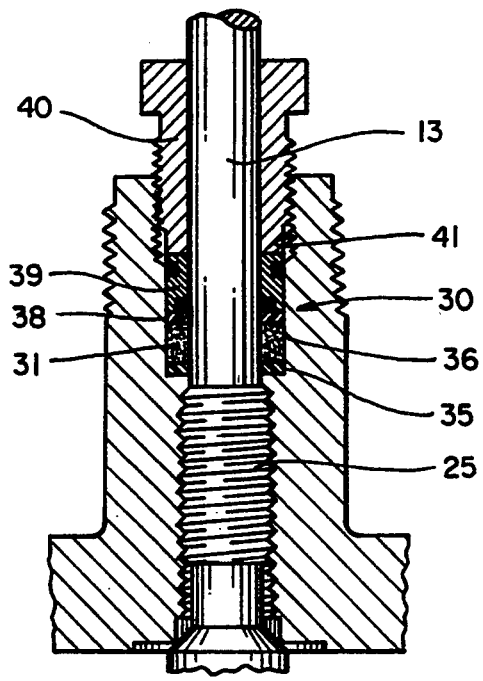
FIG. 2 is an enlarged fragmentary view of the valve bonnet, valve stem, and two stage seal shown in FIG. 1.
Figure 3:
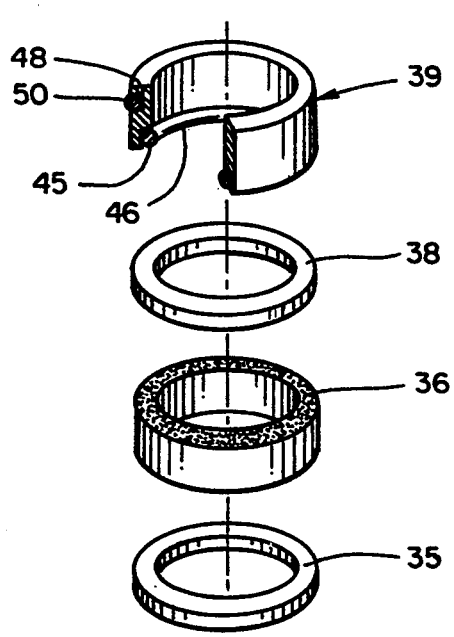
FIG. 3 is an exploded view of the two stage seal including the cartridge gland, packing material, and washers.

Referring to the drawings, the entire shut-off valve is designated by the reference numeral 10 and is seen to generally include a valve body 11 and a transversely arranged bonnet 12 in which a valve stem 13 is axially rotatable to shift a movable valve member 14 from its closed position illustrated on the left to its open position illustrated on the right in FIG. 1 (left and right of the axis of valve stem 13).

The body 11 has a threaded inlet 16 communicating with an inlet chamber 17 with a dividing wall 18 forming a valve seat 19 against which the valve member 14 engages to seal inlet 16 and chamber 17 from an outlet chamber 19 and outlet 20.

The bonnet 12 has an axially stepped through bore 22 having a lower threaded end 24 that threadedly receives lower threaded portion 25 on valve stem 13.

The distal end of the valve stem 13 is threaded at 26 and receives hand wheel 28 for manual valve operation.

A two stage seal system 30 is provided in a counter bore 31 in bonnet passage 22. The two stage valve system 30 includes, in order of assembly into counter bore 31, a flat steel washer 35, an annular packing ring 36, a second flat steel washer 38, an annular cartridge gland 39, all compressed by a packing nut 40 threaded into a threaded portion 41 in the end of the stepped bonnet bore 22.

The packing material 24 is conventional in construction and may take the form of elastomeric flat or V-shaped packing rings, rubber materials, graphite or carbon impregnated asbestos materials.

The cartridge gland 39 is preferably plastic, such as polytetrafluoroethylene("Teflon") and has a lower counter bore 45 that receives an inner "O" ring 46 sealingly engageable with the periphery of valve stem 13. The outer surface of cartridge 39 has an axially spaced recess 48 receiving a larger diameter "O" ring 50 sealing engageable with the counter bore 31. An important aspect of the present invention is that the size of the "O" rings 45 and 50 and the diameters of the cartridge 39 are selected so that the cartridge gland 39 provides more than 50% of the total sealing capacity of dual seal 30. Expressed in other terms, cartridge gland 39 provides greater sealing capacity than the packing material 36 with the packing nut 40 adjusted to a position where the valve stem 13 can be easily manually rotated. With this relationship, it is unnecessary, as in prior art shut-off valves, to relieve packing nut 40 prior to rotating the hand wheel 28.

Another aspect of the present invention is the location of the cartridge 39 immediately below the packing nut 40, which permits it to be easily replaced upon removal of the packing nut, without removing any of the packing material 36. Removal of cartridge 39 is usually done when one of the "O" rings 45 or 50 fails.

After assembly of the seals and washers into the counter bore 31, the packing nut is tightened to the point where the packing material 36 begins to exert pressure on the stem 13 to slightly interfere with hand rotation of the stem.

Another advantage of the present construction is that in the event of failure of one of the "O" ring seals 45 or 50, the packing nut 40 can be threaded down to further compress the packing material 36 to the point where it achieves 100% of the sealing function. In this way the "O" ring seals do not have to be immediately replaced upon failure and the valve will still remain leak-free.

We claim:

1. A manually operable shut-off valve comprising: a valve body having an inlet and an outlet, a valve member movable in the valve body to control flow between the inlet and the outlet, a bonnet on the valve body having an enlarged counter bore therein, a valve stem for opening the valve member threadedly mounted and extending through the enlarged counter bore in the bonnet, a dual sealing system for the valve stem in the bonnet including a compression activated packing in the counter bore having an inner surface sealing by engaging the valve stem, a packing nut threaded in the counter bore in the bonnet for compressing the packing to increase the radial sealing force of the packing against the valve system, a cartridge seal completely mounted in the bonnet counter bore adjacent and between the packing and the nut having an inner seal sealingly engaging the valve stem and an outer seal sealingly engaging the bonnet counter bore fox blocking fluid flow to the packing nut threads, whereby the cartridge seal reduces the sealing requirement of the packing, said packing nut being separate from and engaging the cartridge seal and axially adjustable in the bonnet to vary the compression of the packing as required to prevent leakage, said packing nut being normally in a partly relieved position to permit easy manual rotation of the valve stem without backing off the packing nut each time, said packing nut being movable against the cartridge seal to an unrelieved position when the cartridge seal becomes at least partly ineffective so the cartridge seal further compresses the packing tighter against the valve stem to assume the primary sealing function of the valve stem.

2. A manually operable shut-off valve as defined in claim 1, wherein the cartridge is the primary seal, lowering the sealing requirement of the packing.

3. A manually operable shut-off valve as defined in claim 2, wherein the cartridge is positioned between the packing nut and the packing so it can be easily replaced upon failure without removing the packing.

4. A manually operable shut-off valve as defined in claim 2, wherein the cartridge includes an annular ring having an annular inner surface with an "O" ring receiving recess therein, said annular ring having an outer annular surface with an "O" ring receiving recess therein axially spaced from the inner surface recess.

5. A manually operable shut-off valve as defined in claim 2, including an annular flat washer above and engaging the packing and an annular flat washer below and engaging the packing.

6. A manually operable shut-off valve, comprising: a valve body having an inlet and an outlet, a valve member movable in the valve body to control flow between the inlet and the outlet, a bonnet on the valve body having an enlarged counter bore therein, a valve stem for opening the valve member threadedly mounted and extending through the enlarged counter bore in the bonnet, a dual sealing system for the valve stem in the bonnet including a compression activated packing in the counter bore having an inner surface sealingly engaging the valve stem, a packing nut threaded in the counter bore in the bonnet for compressing the packing to increase the radial sealing force of the packing against the valve stem, a cartridge seal mounted completely in the bonnet counter bore adjacent the packing and between the packing and the packing nut having an inner seal sealingly engaging the valve stem and an outer seal sealingly engaging the bonnet counter bore for blocking fluid flow to the packing nut threads, said cartridge being the primary seal, lowering the sealing requirement of the packing, whereby the cartridge seal reduces the sealing requirement of the packing, and said cartridge being positioned between the packing nut and the packing so it can be easily replaced upon failure without removing the packing, said packing nut being separate from and engaging the cartridge seal and axially adjustable in the bonnet to vary the compression of the packing as required to prevent leakage, said packing nut being normally in a partly relieved position to permit easy manual rotation of the valve stem without backing off the packing nut each time, said packing nut being movable against the cartridge seal to an unrelieved position when the cartridge seal becomes at least partly ineffective so the cartridge seal further compresses the packing tighter against the valve stem to assume the primary sealing function of the valve stem.

7. A manually operable shut-off valve, comprising: a valve body having an inlet and an outlet, a valve member movable in the valve body to control flow between the inlet and the outlet, a bonnet on the valve body having an enlarged counter bore therein, a valve stem for opening the valve member threadedly mounted and extending through the enlarged counter bore in the bonnet, a dual sealing system for the valve stem in the bonnet including a compression activated packing in the counter bore having an inner surface sealingly engaging the valve stem, a cartridge seal mounted completely in and axially movable in the bonnet counter bore engaging and above the packing having an inner seal sealingly engaging the valve stem and an outer seal sealingly engaging the bonnet counter bore, a packing nut threaded in the counter bore in the bonnet engaging the cartridge seal for compressing the packing to increase the radial sealing force of the packing against the valve stem, said outer seal blocking fluid flow to the packing nut threads, said packing nut being separate from and engaging the cartridge seal and axially adjustable in the bonnet to vary the compression of the packing as required to prevent leakage, said packing nut being normally in a partly relieved position to permit easy manual rotation of the valve stem without backing off the packing nut each time, said packing but being movable against the cartridge seal to an unrelieved position when the cartridge seal becomes at least partly ineffective so the cartridge seal further compresses the packing tighter against the valve stem to assume the primary sealing function of the valve stem whereby the cartridge seal reduces the sealing requirement of the packing, said cartridge including an annular ring having an annular inner surface with an "O" ring receiving recess therein, said annular ring having an outer annular surface with an "O" ring receiving recess therein axially spaced-from the inner surface recess.

8. A manually operable shut-off valve, comprising: a valve body having an inlet and an outlet, a valve member movable in the valve body to control flow between the inlet and the outlet, a bonnet in the valve body having an enlarged counter bore therein, a valve stem for opening the valve member threadedly mounted and extending through the enlarged counter bore in the bonnet, a dual sealing system for the valve stem in the bonnet including a compression activated packing in the counter bore having an inner surface sealingly engaging the valve stem, a washer beneath and engaging the packing seated in the lower end of the counter bore in the bonnet, a washer above and engaging the packing, a cartridge seal in the bonnet counter bore having an inner seal sealingly engaging the valve stem and an outer seal sealingly engaging the bonnet counter bore, said cartridge being mounted above and in engagement with the washer above the packing, said cartridge being axially movable in the bonnet counter bore, and a packing nut threaded in the bonnet counter bore adjustable to vary the compression and sealing force of the packing on the valve stem through the axially movable cartridge, said outer seal blocking flow to the packing nut threads, said packing nut being separate from and engaging the cartridge seal and axially adjustable in the bonnet to vary the compression of be packing as required to prevent leakage said packing nut being normally in a partly relieved position to permit easy manual rotation of the valve stem without backing off the packing nut each time, said packing nut being movable against the cartridge seal to an unrelieved position when the cartridge seal becomes at least partly ineffective the cartridge seal further compresses the packing tighter against the valve stem to assume the primary sealing function of the valve stem.

* * * * *